United States Patent
Hughes, Jr.

[11] 3,984,111
[45] Oct. 5, 1976

[54] TOY PHONOGRAPH

[76] Inventor: Alexander W. Hughes, Jr., 19 Wardell Circle, Oceanport, N.J. 07757

[22] Filed: Oct. 20, 1975

[21] Appl. No.: 623,564

[52] U.S. Cl. .............................. 274/1 A; 274/15 R
[51] Int. Cl.[2] ..................... A63H 3/33; G11B 17/06
[58] Field of Search ........... 274/1 A, 14, 15 R, 15 A

[56] References Cited
UNITED STATES PATENTS

| | | | |
|---|---|---|---|
| 3,544,115 | 12/1970 | Licitis et al. .......................... | 274/1 A |
| 3,589,735 | 6/1971 | Watanabe ............................ | 274/1 A |
| 3,784,210 | 1/1974 | Fox et al. ............................. | 274/15 A |

FOREIGN PATENTS OR APPLICATIONS

| | | | |
|---|---|---|---|
| 828,608 | 2/1960 | United Kingdom .................. | 274/15 A |

Primary Examiner—Richard E. Aegerter
Assistant Examiner—Steven L. Stephan
Attorney, Agent, or Firm—Hubbell, Cohen, Stiefel & Gross

[57] ABSTRACT

An improved toy phonograph in which a phonograph record is mountable on a rotating turntable with sound being picked up from the record by a pivoted pickup arm which is direct contact with a speaker cone assembly which presses the pickup arm into playing engagement with the phonograph record. The pickup arm is automatically reset to the periphery of the record upon completion of play of the record by engagement of a protrusion on the pickup arm with a protrusion on the floating cam at the end of the play of the record. The floating cam is biased into nesting engagement with a congruent cam fixedly mounted on the turntable for rotation therewith with both cams being a triangularly sloped peripheral engageable cam surface for substantially 180° of the peripheral circumference of the cams. The stopping of the floating cam during rotation of the turntable causes the floating cam peripheral cam surface to ride up the sloped surface of the other cam thereby driving it out of nesting engagement therewith raising the floating cam a sufficient amount to contact the speaker cone assembly and lift it out of biasing engagement with the pickup arm whereby the pickup arm, which is normally spring biased towards the periphery of the record, automatically returns to the periphery of the record thereby disengaging the protrusion on the pickup arm from the protrusion on the floating cam and, after reset of the pickup arm, thereby enabling return of the speaker cone assembly to biasing contact with the pickup arm pressing it into engagement with the phonograph record for enabling replay thereof.

9 Claims, 7 Drawing Figures

U.S. Patent  Oct. 5, 1976  3,984,111
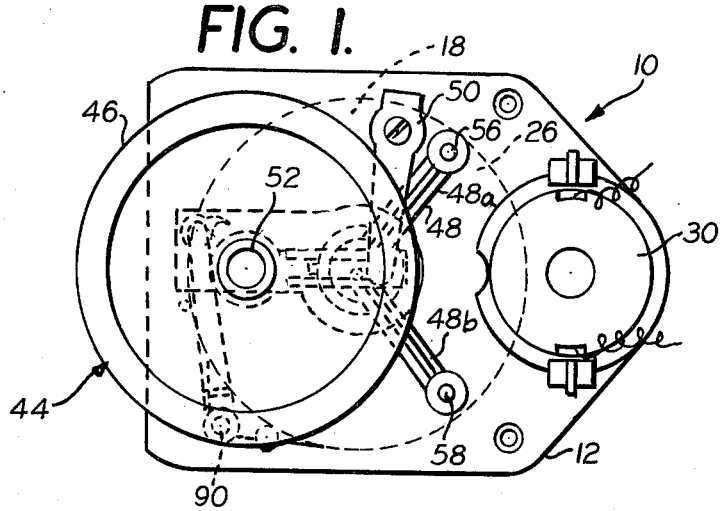
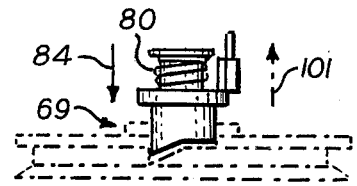
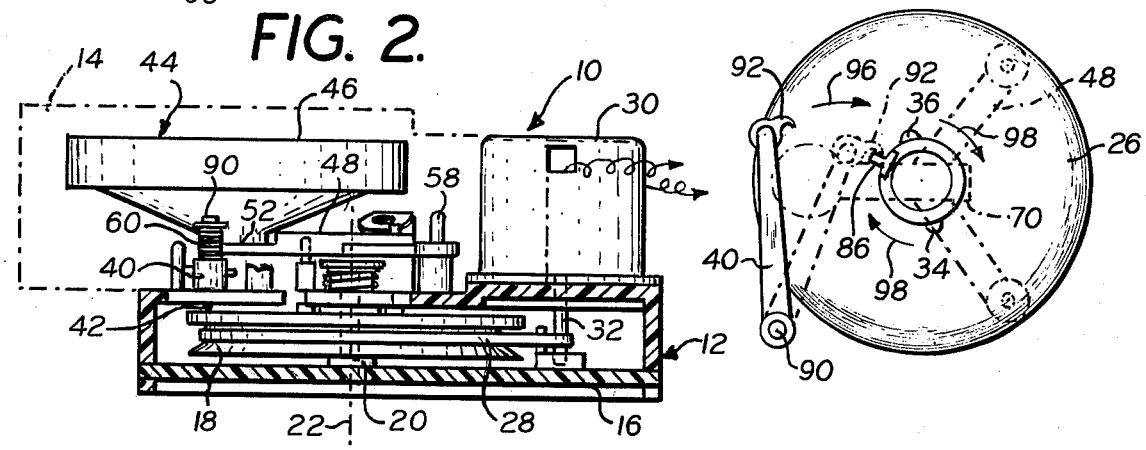
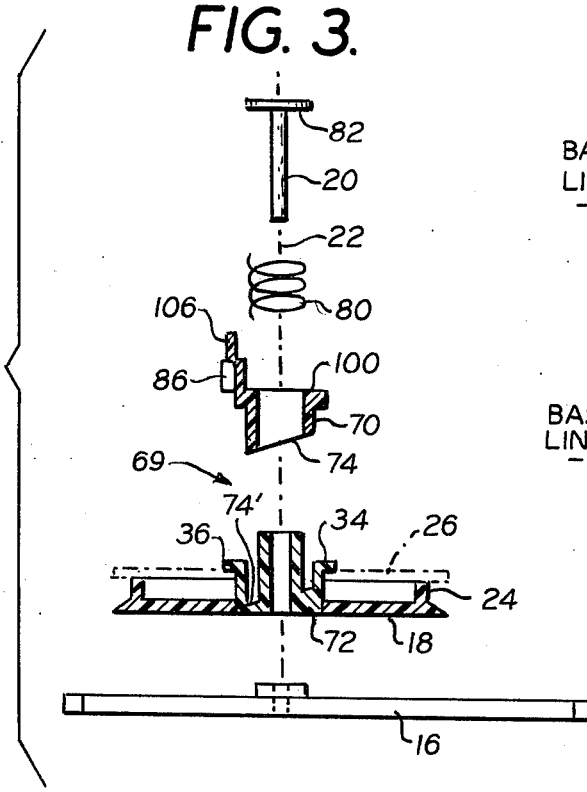
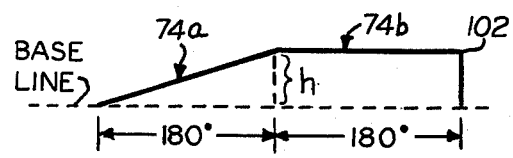

TOY PHONOGRAPH

BACKGROUND OF THE INVENTION

1. Field of the Invention

The present invention relates to phonographs and particularly to the types of phonographs known as toy phonographs.

2. Description of the Prior Art

Toy phonographs, that is phonographs such as for use as talking voice boxes, such as for talking dolls or other types of so-called talking toys, such as talking alarm clocks, are well known. An example of such prior art toy phonographs is disclosed in U.S. Pat. Nos. 3,589,735; 3,208,755; 3,055,664; 3,467,393; 3,823,946; 3,401,942; 3,208,755; and Canadian Pat. No. 707,932, by way of example. The entire field with respect to toy phonographs has been quite active with the primary motivation, because of their use in toys, being economics, efficiency and size so as to provide a practical commercial embodiment for use in economically viable children's toys. Thus, the above patents provided by way of example, merely disclose a quantitatively small amount of the large volume of different types of toy phonographs existent in the prior art with the differences between the various prior art toy phonographs in an attempt to provide toy phonographs which are economically viable being relatively narrow since apparently minor improvements can provide a significant improvement in efficiency and economics in the area of toy phonographs.

SUMMARY OF THE INVENTION

An improved toy phonograph is provided. In such a toy phonograph comprising a housing, the housing comprising a base, a turntable rotatably mounted on the base for rotation about an axis of rotation, a pickup arm pivoted at one end and engageable with a playing surface of a phonograph record rotatably mounted on the turntable, the phonograph record having a periphery, a first spring, the pickup arm being constantly placed under a force of the first spring which urges the pickup arm toward the periphery of the phonograph record, a speaker cone assembly resiliently mounted on the housing above the pickup arm, and a second spring resiliently urging the speaker cone assembly into contact with the pickup arm with a biasing force for pressing the pickup arm into engagement with the phonograph record for reproducing recorded sound from the phonograph record playing surface; the improvement comprises a cam arrangement including a floating cam member containing a protrusion thereon which is engageable with a protrusion on the pickup arm when the pickup arm reaches the end of the phonograph record for contacting the speaker cone assembly with the floating cam to urge the speaker cone assembly out of engagement with the pickup arm to enable the pickup arm to be resiliently reset to the periphery of the phonograph record by the first spring while thereby disengaging the aforementioned protrusions. In order to accomplish this, a substantially circular cam is axially mounted on the turntable axis of rotation and fixedly rotatable therewith, with the floating cam being nestable with this cam for rotation therewith when in nested engagement therewith. The floating cam has a substantially triangularly sloped lower peripheral cam surface with respect to the turntable for substantially 180° of the peripheral circumference of the floating cam while the other cam has a congruent upper peripheral cam surface nestable with the floating cam lower peripheral cam surface. A third spring resiliently urges the floating cam lower peripheral cam surface into nesting engagement with the other cam upper peripheral cam surface. The protrusion on the floating cam extends outwardly therefrom beneath the speaker cone assembly parallel to the phonograph record playing surface and is normally biased out of engagement with the speaker cone assembly by the third spring. A protrusion on the pickup arm extends outwardly from the pickup arm parallel to the phonograph record playing surface and is pivotally movable with the pickup arm. As previously mentioned, the protrusion on the pickup arm and the protrusion on the floating cam are engageable for halting rotation of the floating cam when the pickup arm is adjacent the end of the phonograph record recording. The turntable and the other cam are still rotatable when the protrusions are in engagement and the rotating cam upper peripheral cam surface is driven out of nesting engagement with the floating cam lower peripheral cam surface during rotation of the turntable when the aforementioned protrusions are in engagement. The floating cam triangularly sloped lower peripheral surface rides up the triangularly sloped other cam surface as the cam surfaces are driven out of such nesting engagement to enable sufficient contact of the floating cam with the speaker cone assembly to overcome the second spring biasing force and urge the speaker cone assembly out of engagement with the pickup arm to enable the pickup arm to be resiliently reset to the periphery of the phonograph record by the first spring while thereby disengaging the aforementioned protrusions. Upon such disengagement, the cams return to nesting engagement and the speaker cone assembly returns to contact with the pickup arm. Means are also preferably provided for insuring prevention of inadvertent return of such contact and nesting engagement prior to completion of the reset of the pickup arm to the phonograph record periphery. In order to prevent such return to contact and nesting engagement prior to completion of pickup arm reset, the floating cam preferably comprises an upstanding third protrusion which is rotatable beneath the speaker cone assembly when the cams are in nesting engagement. The speaker cone assembly preferably comprises a lift bar for contacting the floating cam for enabling the speaker cone assembly to be urged out of engagement with the pickup arm by the floating cam as the cam surfaces are driven out of engagement. The third protrusion on the floating cam is engageable with the lift bar to prevent further rotation of the floating cam until reset of the pickup arm to the phonograph record periphery when the cams have been driven out of nesting engagement after engagement of the first and second protrusions with the engaged third protrusion and the lift bar comprising the aforementioned prevention means, whereby the third protrusion disengages from the lift bar and the cams return to nesting engagement after the pickup arm reset.

BRIEF DESCRIPTION OF THE DRAWINGS

FIG. 1 is a top plan view of the preferred embodiment of the improved toy phonograph of the present invention with the cover removed;

FIG. 2 is a partially cut away side elevation of the embodiment of FIG. 1 with the cover shown in position in dotted lines;

FIG. 3 is a fragmentary exploded view, partially in section, of the turntable portion of the embodiment of FIG. 1;

FIG. 4 is a fragmentary view, similar to FIG. 3, of the turntable portion of the embodiment of FIG. 1 assembled;

FIG. 5 is a fragmentary plan view of the pickup arm and turntable portions of the embodiment of FIG. 1 diagrammatically illustrating their interrelationship;

FIG. 6 is a developed view of the bottom of the top cam or top of the bottom cam of the cam assembly illustrated in FIGS. 3 and 4; and FIG. 7 is a developed view of an alternative embodiment of the bottom of the top cam or top of the bottom cam of the cam assembly illustrated in FIGS. 3 and 4.

DETAILED DESCRIPTION OF THE PREFERRED EMBODIMENTS

Referring now to the drawings in detail and initially to FIGS. 1 and 2 thereof, an improved toy phonograph, generally referred to by the reference numeral 10, in accordance with the present invention is shown. As in previous conventional toy phonographs, such as the type described in U.S. Pat. No. 3,589,735, the phonograph comprises a housing 12 to which a cover 14, normally containing a speaker grill (now shown), is mounted conventionally such as by screws. The housing 12, as shown and preferred in FIG. 2, includes a base portion 16 which is preferably fixedly secured to the balance of the housing 12, such as by screws which are removable so as to allow access to the interior of the housing 12. A conventional turntable 18 is preferably rotatably mounted on the base 16 in housing 12 by means of a conventional centrally located spindle or shaft 20 mounted in the base 16 for rotation therein. The shaft 20 is located along the central axis 22 of the turntable 18. As shown and preferred in FIGS. 2 and 3, the configuration of the turntable is such so as to form a groove 24 normal to the axis 22 of the shaft 20 in conjunction with a phonograph record 26 which is preferably removably mounted on the turntable 18 for rotation therewith. As shown and preferred in FIG. 2, the groove 24 which preferably extends completely around the turntable contains an endless belt, such as a conventional rubber band 28, which is driven in conventional fashion by a DC motor 30 which receives power from a battery (not shown). The drive is accomplished in conventional fashion by a knurled shaft 32 which extends from the motor into the interior of the housing 12, with the rubber band or belt 28 extending around the shaft 32 and around the turntable 18 in groove 24 so as to create a belt drive type of conventional arrangement which is well known for the drive of battery powered toy phonographs. The phonograph record 26 is a conventional plastic disc record such as the type conventionally utilized for talking voice boxes or toy phonographs, such as for use in dolls. As shown and preferred in FIG. 3, the phonograph record 26, which is preferably removable from the turntable 18 is preferably snap fit onto the turntable 18 and is held in place by means of resilient plastic fingers 34 and 36, by way of example.

As also shown and preferred in FIGS. 1 and 2, the toy phonograph 10 of the present invention utilizes a conventional sound pickup mechanism for reproducing recorded sound from the phonograph record 26 playing surface. This conventional sound pickup mechanism, such as the type described in U.S. Pat. Nos. 3,589,735 or 3,054,664 or Canadian Pat. No. 707,932, preferably consists of a pickup arm 40 having a conventional phonograph needle 42 extending therefrom for contacting the playing surface of the phonograph record 46 and a speaker cone assembly 44 which, when in direct contact with the pickup arm 40 as shown in FIG. 2, conventionally reproduces sound from the phonograph record playing surface 26 picked up by the needle 42, providing this sound in conventional fashion by vibration of the speaker cone 46 forming part of the speaker cone assembly 44. As also shown and preferred in FIGS. 1, 2 and 5, the speaker cone assembly 44 also comprises a conventional Y-shaped lift bar mechanism 48 for enabling the speaker cone 46 to be lifted out of and biased into engagement with the pickup arm 40 as is accomplished in conventional available toy phonographs; although, the camming mechanism for accomplishing the engagement and disengagement of the speaker cone assembly with the pickup arm 40 is not conventional as will be described in greater detail hereinafter. As shown and preferred in FIGS. 1 and 2, the pickup arm is spring biased, such as by a conventional leaf spring 50 bearing against the lift bar 48, which lift bar 48 is fixedly secured to the speaker cone 46 at the center 52 thereof, into playing engagement with the phonograph record 26 playing surface as shown in FIG. 2. The lift bar mechanism 48 and, hence, the entire speaker cone assembly 44 which moves as a unit, is slidably mounted via extension arms 48a and 48b of the Y-shape forming the lift bar 48 on posts 56 and 58, respectively for slidable movement up and down therealong. A third point of contact or support of the lift bar 48 is made at point 52 which is in removable spring biased contact with the pickup arm 40 as is shown and preferred in FIG. 2. As was previously mentioned, the spring 50 presses against the lift bar 48 and, thus, biases point 52 of the speaker cone assembly into direct contact with pickup arm 40 which then biases the needle 42 into playing engagement with the phonograph record playing surface 26. The pickup arm 40, via a conventional spring 60 is conventionally spring biased in a direction parallel to the playing surface of the phonograph record 26 toward the periphery thereof; however, the force of spring 50 is preferably sufficient to overcome the force of spring 60 so as to prevent the pickup arm 40, in conventional fashion, from moving toward the periphery of the phonograph record 26 during play while the speaker cone assembly 44 is in direct contact with the pickup arm 40.

As shown and preferred in FIGS. 3 through 6, and as will be described in greater detail hereinafter, when the pickup arm 40 reaches the end of the record, that is the end of the recording, which is conventionally located adjacent the center of the record, a camming assembly 69 will lift the speaker cone assembly 44 out of engagement with the pickup arm 40 so as to enable automatic reset of the pickup arm 40 to the periphery of the phonograph record 26 under the action of spring 60 and, subsequently, when this has been accomplished, return the speaker cone assembly 44 into direct engagement with pickup arm 40 to enable replay of the recording. In order to accomplish this, the cam assembly 69 preferably comprises a floating cam 70, to be described in greater detail hereinafter, and a second cam 72 which is axially mounted on the turntable axis of rotation and fixedly rotatable therewith. As shown and preferred in FIGS. 3 and 4, cams 70 and 72 are nestable with each other for rotation therewith when in nested engagement. Both cams 70 and 72 are preferably substantially circular in configuration and have mateable camming surfaces preferably having the configurations illustrated in FIG. 6 wherein the cam surfaces are preferably triangularly sloped for substantially 180° of the peripheral or lower surface of cam 70, represented by reference numeral 74, with 74a comprising the triangularly sloped portion, and are substantially straight or planar for the balance of the bottom peripheral surface such as represented by 74b in FIG. 6. Since these cam surfaces are mateable, 74a and 74b correspond to identical surfaces 74a' and 74b' comprising surface 74' which is the top surface of the bottom cam 72 in the arrangement illustrated in FIGS. 3 and 4. The floating cam 70 is biased into nesting engagement with cam 72 by means of a spring 80 held in place by shaft 20 which extends through the interior of floating cam 70 and through the center of cam 72 and the turntable 18 and which, by virtue of cap or head 82 on shaft 20 which shaft 20 is fitted into base 16, holds the entire arrangement in position about the central axis 22 for rotation thereabout. As shown and preferred in FIG. 4, this spring 80 biases the cams 70 and 72 into nesting engagement by applying a spring force in the direction of arrow 84.

As further shown and preferred in FIGS. 3 through 5, the floating cam 70 preferably includes an outwardly extending protrusion 86 which preferably extends outwardly parallel to the playing surface of the phonograph record 26 with the protrusion preferably being unitary with the floating cam 70 so as to be rotatable therewith. The pickup arm 40, which is conventionally pivotally mounted such as at pivot point 90, on the housing 12, preferably includes a hook portion 92 extending therefrom also parallel to the playing surface of the phonograph record 26 for engagement with the protrusion 86 at the end of the playing of the record as illustrated in FIG. 5.

Referring now to FIGS. 4 through 6, the operation of the camming assembly 69 to lift the speaker cone assembly 44 out of engagement with the pickup arm 40 to enable automatic reset of the pickup arm 40 to the periphery of the record 26 shall now be described. As was previously described, the pickup arm 40 is biased in conventional fashion into playing engagement with the phonograph record 26 playing surface via the speaker cone assembly 44 with which it is in direct engagement to enable reproduction of the recorded sound. The pickup arm 40 conventionally moves along the record groove towards the center of the record 26, as indicated by arrow 96, to reproduce the sound recorded on the record 26 as the turntable 18, and, hence, the phonograph record 26, rotates due to the belt drive 28. During this time, surfaces 74 and 74' of cams 70 and 72, respectively, are in nesting engagement and thus, simultaneously rotate together. During such simultaneous rotation, the protrusion 86 is situated so as to be rotatable beneath the lift bar 48 so as to be out of contact with the speaker cone assembly 44. As the pickup arm 40 nears the end or center of the phonograph record 26, the hook 92 engages the protrusion 86, with the phonograph record 26 continuing to be driven by motor 30 for rotation in the direction of arrow 98. This engagement of the hook 92 with the protrusion 86 prevents the floating cam 70 from further rotation. However, the bottom cam 72 which is fixedly rotatable with the turntable 18 continues to rotate due to the drive of the motor 30. This continued rotation of the bottom cam 72 while the floating cam 70 is now held stopped against rotation causes the floating cam 70 lower surface 74 to ride up the triangularly sloped surface 74a' of bottom cam 72, overcoming the spring force of spring 80, to the level of straight surface 74b'. The height h or total rise of the sloped surface 74a' is sufficient to enable contact of the top surface 100 of the floating cam 70 with the lift bar 48 and to lift it a sufficient amount in the direction of arrow 101 to enable the spring loaded pickup arm or needle arm 40 to no longer be in contact with the speaker cone assembly 44 and thus enable the spring loaded needle or pickup arm 40 to reset to its starting position at the periphery of the phonograph record 26. The 180° extent of the straight surfaces 74b and 74b' is preferably sufficient to enable the pickup arm 40 to completely return to the starting position at the periphery of the phonograph record 26. When this is accomplished, as the bottom cam 72 continues to rotate, the floating cam 70 sharply returns to nesting engagement with cam 72 by dropping off at point 102 back to the base line or starting point of the sloped surface 74a thus removing the force in the direction of arrow 101 and re-establishing direct contact between the speaker cone assembly 44 and the pickup arm 40 due to spring 50 again pressing the speaker cone assembly 44 and the pickup arm 40 into playing engagement with the phonograph record 26 playing surface. If desired, as shown and preferred in FIG. 7, the drop off rather than being immediate could be slightly more gradual as indicated by the sloped surface 104 in FIG. 7.

As further shown and preferred in FIGS. 3 through 5, if desired, the floating cam 70 may also include a second protrusion 106 which is perpendicular to protrusion 86 and extends upwardly therefrom. The purpose of this protrusion 106 is to prevent inadvertent rotation of the floating cam 70, such as due to slippage, and subsequent return to nesting engagement with cam 72 prior to the completion of the reset or return of the pickup or needle arm 40 to the periphery of the record 26. In such an arrangement, protrusion 106 is preferably located on the top surface of floating cam 70 so as to be rotatable beneath the speaker cone assembly 44 lift bar 48 during normal play. When the hook 92 and protrusion 86 are in engagement and thereby cause the subsequent raising of the floating cam 70 to contact the lift bar 48 and lift it out of engagement with pickup arm 40, protrusion 106 is preferably located so as to fall between arms 48a and 48b and most preferably to bear against one of these arms so as to thereby prevent inadvertent slippage and rotation of the floating cam 70 at this time. When the pickup arm 40 has returned to the periphery of the record 26 as was previously described and the floating cam 70 drops off at point 102 either instantaneously as illustrated in FIG. 6 or more gradually via slope 104 as illustrated in FIG. 7, the protrusion 106 again returns below lift bar 48 and, thus, is no longer in bearing engagement with arm 48a or 48b, thus enabling the floating cam 70 to rotate and return to nesting engagement with cam 72.

Summarizing the operation of the improved toy phonograph of the present invention, the operation is as follows. The phonograph record 26 is mountable on the rotating turntable 18 which is driven by motor 30 due to belt drive 28. Recorded sound is picked up from the record 26 by pivoted pickup or needle arm 40 which is in direct contact with speaker cone assembly 44 due to spring 50 which presses the pickup arm 40 into playing engagement with the phonograph record 26. The pickup arm 40 is automatically reset to the periphery of the record 26 upon completion of play of the record 26 by engagement of hook protrusion 92 on the pickup arm 40 with protrusion 86 on the floating cam 70 at the end of the play of the record 26. Floating cam 70 is biased into nesting engagement with the congruent cam 72 fixedly mounted on the turntable 18 for rotation therewith with both cams 70 and 72 being triangularly sloped such as via sloped surfaces 74a and 74a' for substantially 180° of the peripheral engageable surface of the cams 70 and 72. The stopping of the floating cam 70 during rotation of the turntable 18 causes the floating cam 70 peripheral cam surface 74 to ride up the sloped surface 74a of the other cam 72 thereby driving it out of nesting engagement therewith and raising the floating cam 70 a sufficient amount to contact the speaker cone assembly 44 and lift it out of biasing engagement with the pickup arm 40 whereby the pickup arm 40, which is normally spring biased towards the periphery of the record 26 via spring 60, automatically returns to the periphery of the record 26 thereby disengaging the hooked protrusion 92 on the pickup arm 40 from the protrusion 86 on the floating cam 70 and, after reset of the pickup arm 40, thereby enabling return of the speaker cone assembly 44 to biasing contact with the pickup arm 40 pressing it into engagement with the phonograph record 26 for enabling replay thereof.

What is claimed is:

1. In a toy phonograph comprising a housing, said housing comprising a base, a turntable rotatably mounted on said base for rotation about an axis of rotation, a pickup arm pivoted at one end and engageable with a playing surface of a phonograph record rotatably mounted on said turntable, said phonograph record having a periphery, a first spring means, said pickup arm being constantly placed under a force of said first spring means which urges said pickup arm toward the periphery of said phonograph record, a speaker cone means resiliently mounted on said housing above said pickup arm, and second spring means resiliently urging said speaker cone means into contact with said pickup arm with a biasing force for pressing said pickup arm into engagement with said phonograph record for reproducing recorded sound from said phonograph record playing surface; the improvement comprising a first substantially circular cam means axially mounted on said turntable axis of rotation and fixedly rotatable therewith, a second substantially circular cam means nestable with said first cam means for rotation therewith when in nested engagement therewith said second cam means being a floating cam means and having a substantially triangularly sloped lower peripheral cam surface with respect to said turntable for substantially 180° of the peripheral circumference of said second cam means, said first cam means having a congruent upper peripheral cam surface nestable with said second cam means lower peripheral cam surface, third spring means resiliently urging said second floating cam means lower peripheral cam surface into nesting engagement with said first cam means upper peripheral cam surface, said second floating cam means comprising a first protrusion extending outwardly therefrom beneath said speaker cone means parallel to said phonograph record playing surface and being normally biased out of engagement with said speaker cone means by said third spring means, said pickup arm comprising a second protrusion extending outwardly from said pickup arm parallel to said phonograph record playing surface and being pivotally movable with said pickup arm, said first and second protrusions being engageable for halting rotation of said second floating cam means when said pickup arm is adjacent the end of said phonograph record recording, said turntable and said first cam means still being rotatable when said first and second protrusions are in engagement, said rotating first cam means upper peripheral cam surface being driven out of nesting engagement with said second cam lower peripheral cam surface during rotation of said turntable when said first and second protrusions are in engagement, said second cam means triangularly sloped lower peripheral cam surface rising up said triangularly sloped first peripheral cam surface as said cam surfaces are driven out of said nesting engagement to enable sufficient contact of said second cam means with said speaker cone means to overcome said second spring means biasing force and urge said speaker cone means out of engagement with said pickup arm to enable said pickup arm to be resiliently reset to the periphery of said phonograph record by said first spring while thereby disengaging said first and second protrusions.

2. An improved toy phonograph in accordance with claim 1 wherein said disengagement of said first and second protrusions enables said first and second cam means to return to said nesting engagement and said speaker cone means to return to contact with said pickup arm.

3. An improved toy phonograph in accordance with claim 2 wherein said phonograph comprises means for preventing said contact and nesting engagement returns prior to reset of said pickup arm to said phonograph record periphery.

4. An improved toy phonograph in accordance with claim 3 wherein said speaker cone means comprises a lift bar means for contacting said second cam means for enabling said speaker cone means to be urged out of engagement with said pickup arm by said second cam means as said cam surfaces are driven out of engagement.

5. An improved toy phonograph in accordance with claim 4 wherein said second cam means comprises an upstanding third protrusion being rotatable beneath said lift bar means when said first and second cam means are in nesting engagement and being engageable with said lift bar means to prevent further rotation of said second cam means until reset of said pickup arm to said phonograph record periphery when said first and second cam means have been driven out of said nesting engagement after engagement of said first and second protrusions, said engaged third protrusion and lift bar means comprising said preventing means, whereby said third protrusion disengages from said lift bar means and said first and second cam means return to said nesting engagement after said pickup arm reset.

6. An improved toy phonograph in accordance with claim 1 wherein said speaker cone means comprises a lift bar means for contacting said second cam means for enabling said speaker cone means to be urged out of engagement with said pickup arm by said second cam means as said cam surfaces are driven out of engagement.

7. An improved toy phonograph in accordance with claim 1 wherein said first spring means further tends to urge said pickup arm out of engagement with said phonograph record, said second spring means overcoming said first spring means further tendency except when said first and second protrusions are in engagement and said speaker cone means is urged out of engagement with said pickup arm, whereby said pickup arm is urged out of engagement with said phonograph record during said pickup arm reset.

8. An improved toy phonograph in accordance with claim 1 wherein said first protrusion further is upwardly extending and contacts said speaker cone means for enabling said urging of said speaker cone means out of engagement with said pickup arm during said first and second cam means being driven out of nesting engagement.

9. An improved toy phonograph in accordance with claim 1 wherein said phonograph record is removably mounted on the turntable.

* * * * *